March 19, 1929.  W. G. LEHMANN ET AL  1,705,821
MACHINE FOR FABRICATING WIRE SPRING STRUCTURES
Filed Dec. 21, 1926  11 Sheets-Sheet 1

Inventor
W. G. LEHMANN
D. T. OWEN

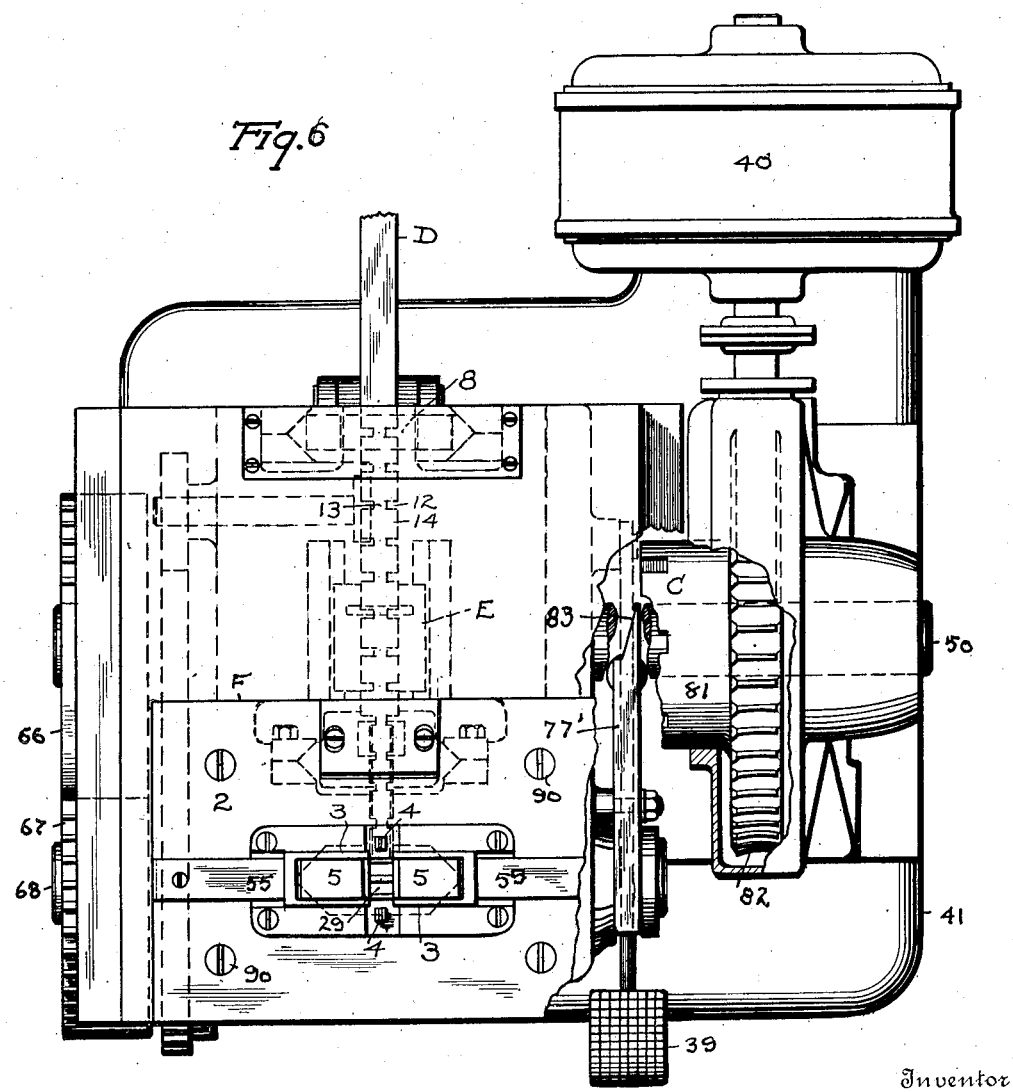

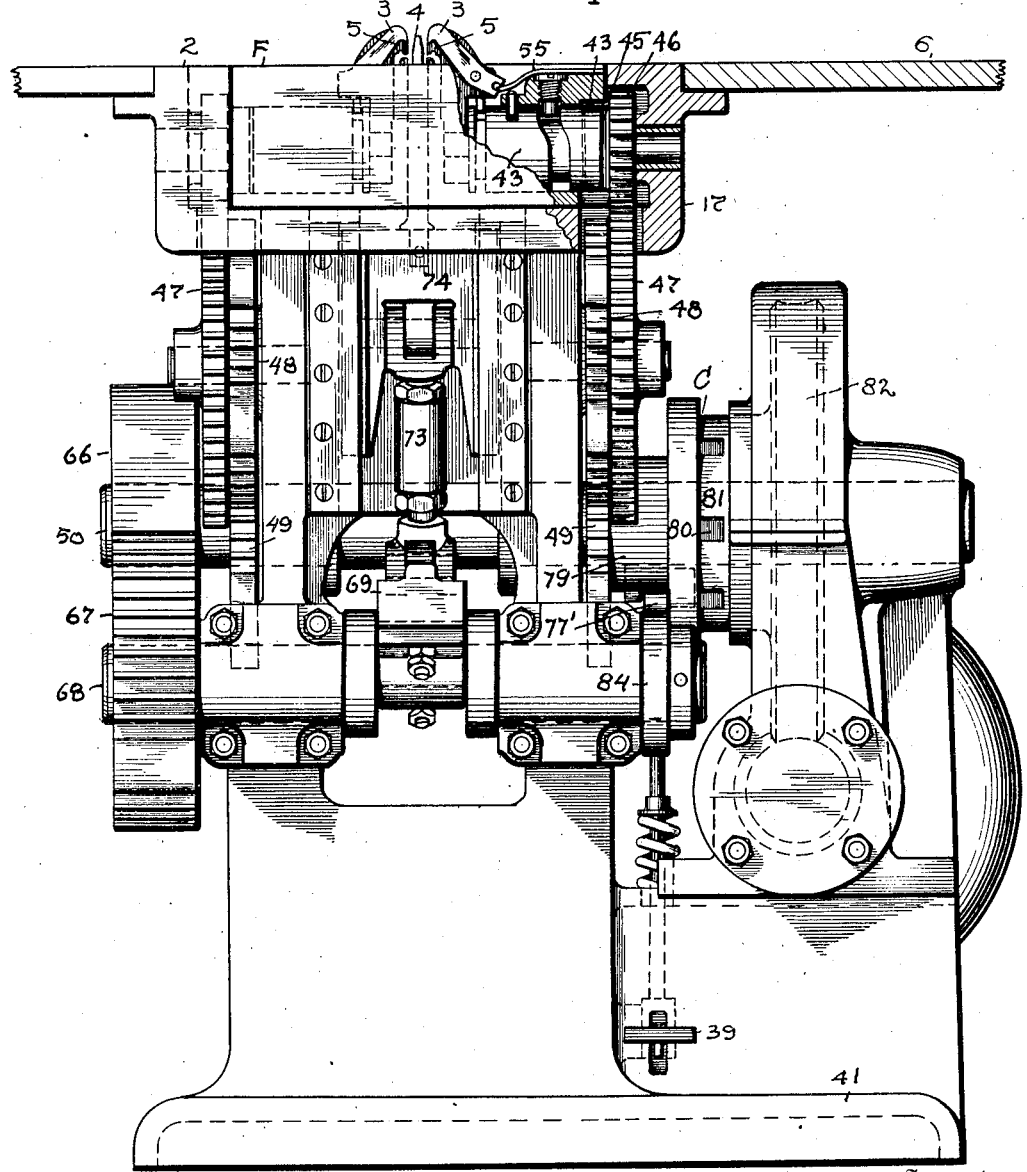

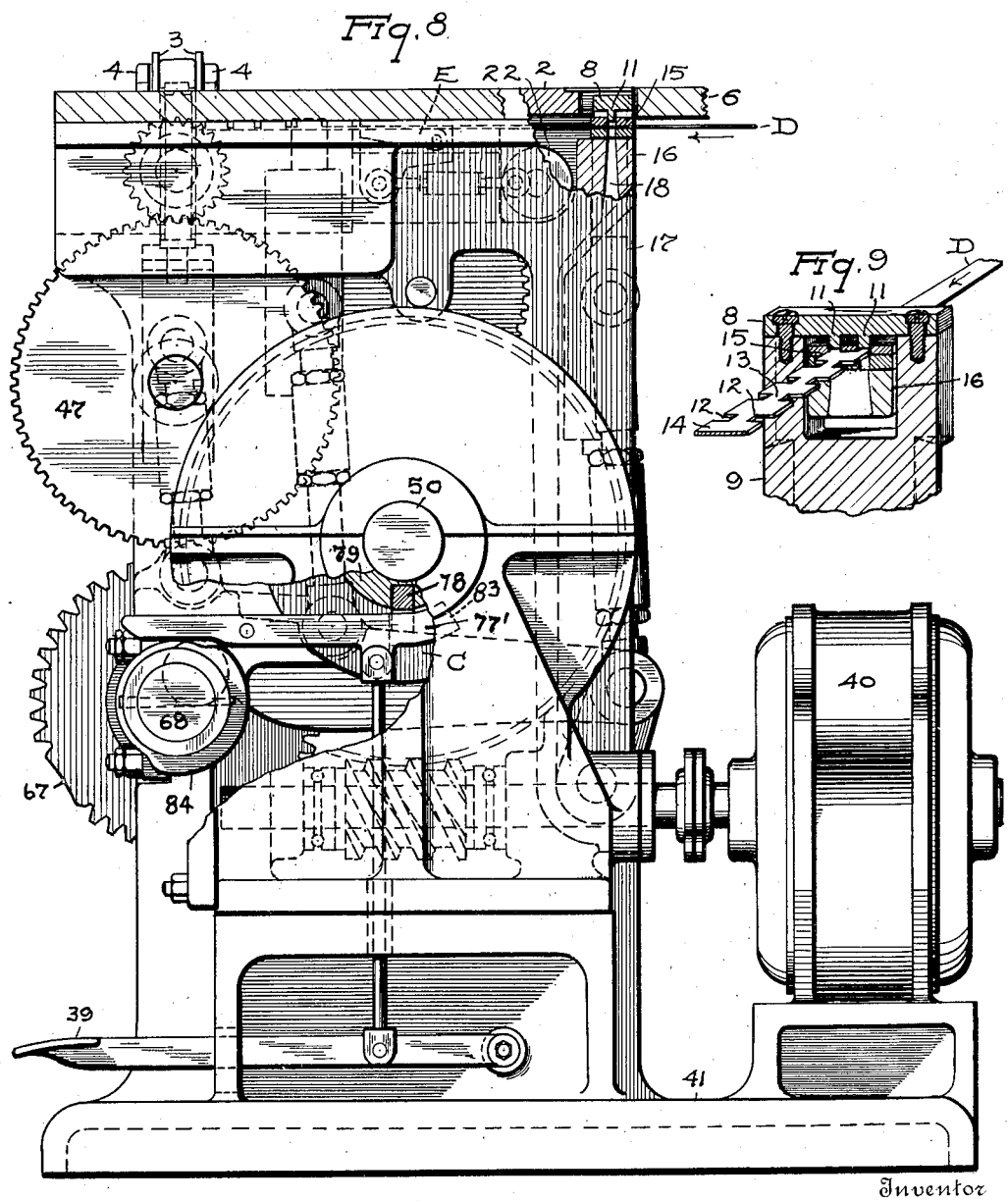

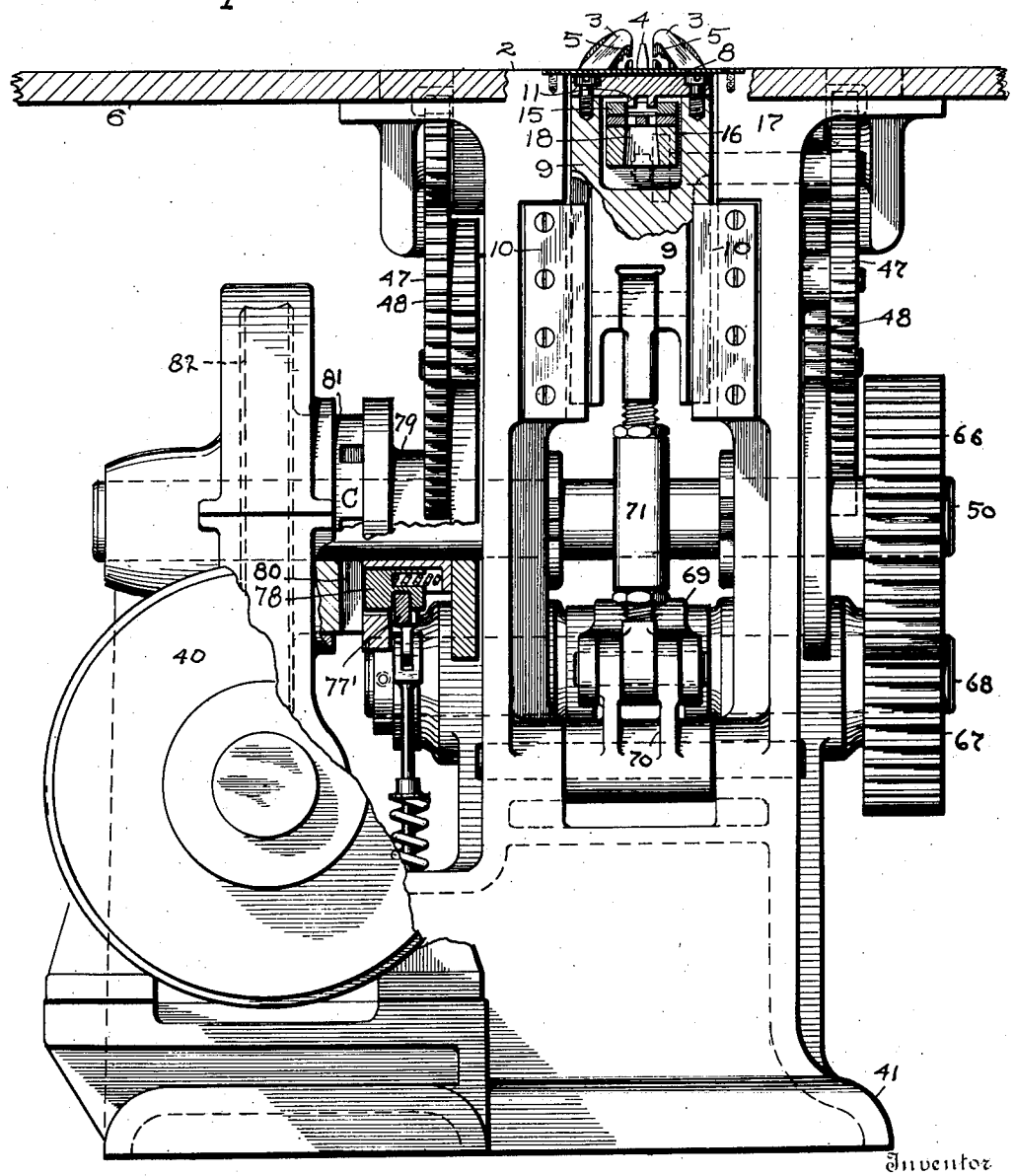

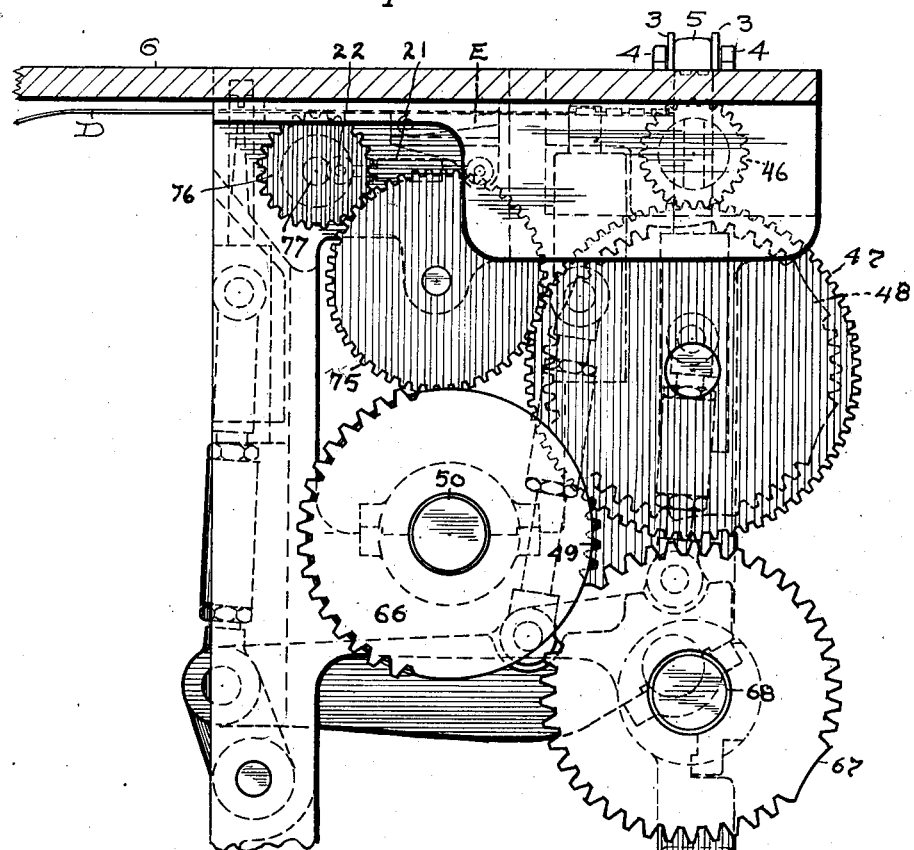
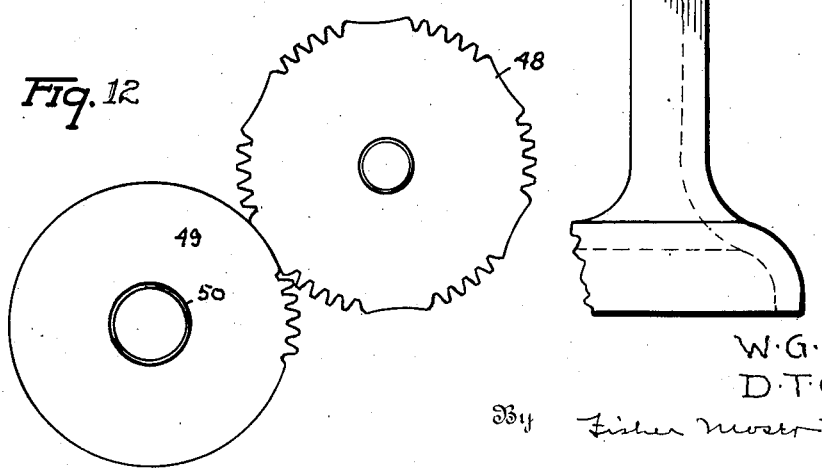

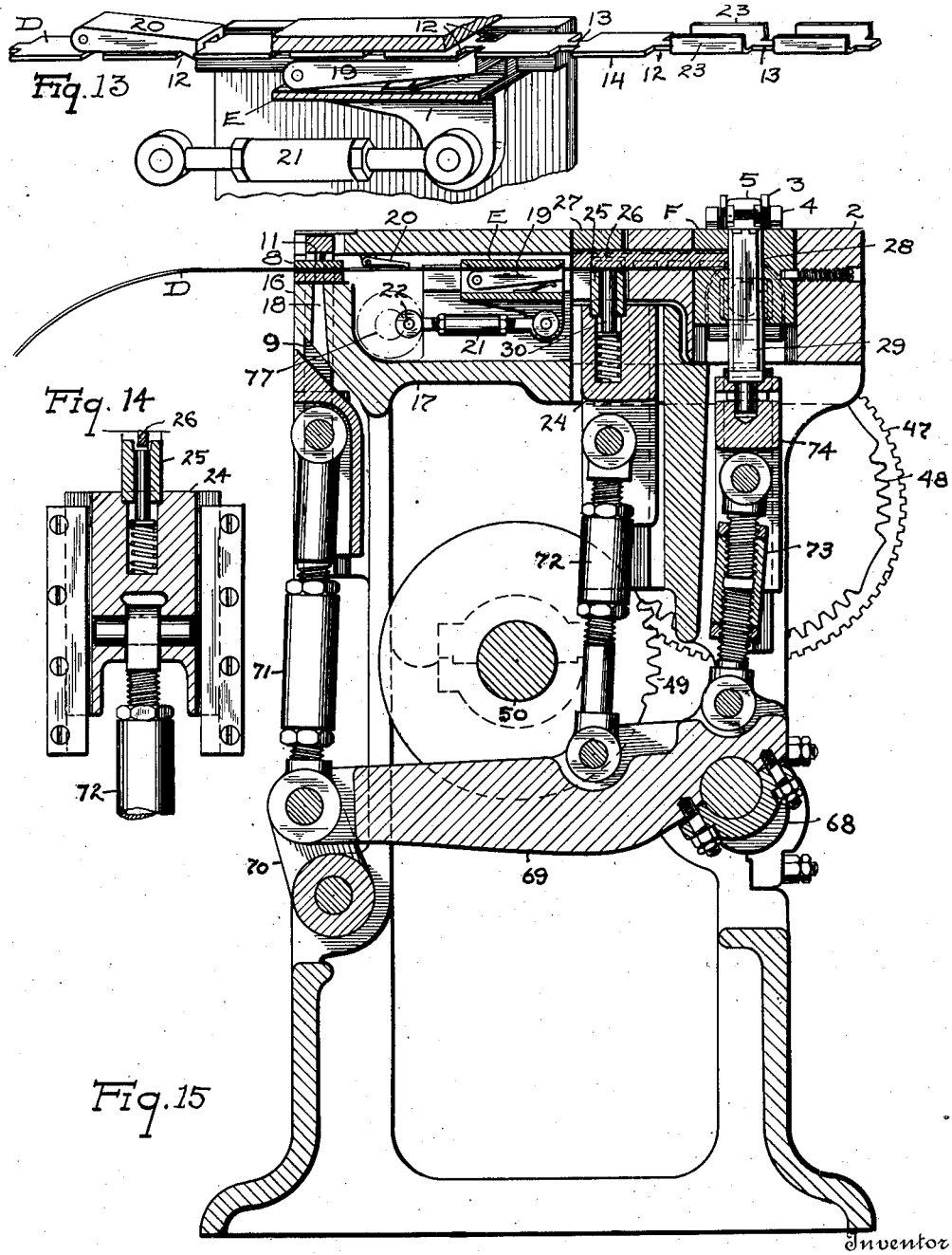

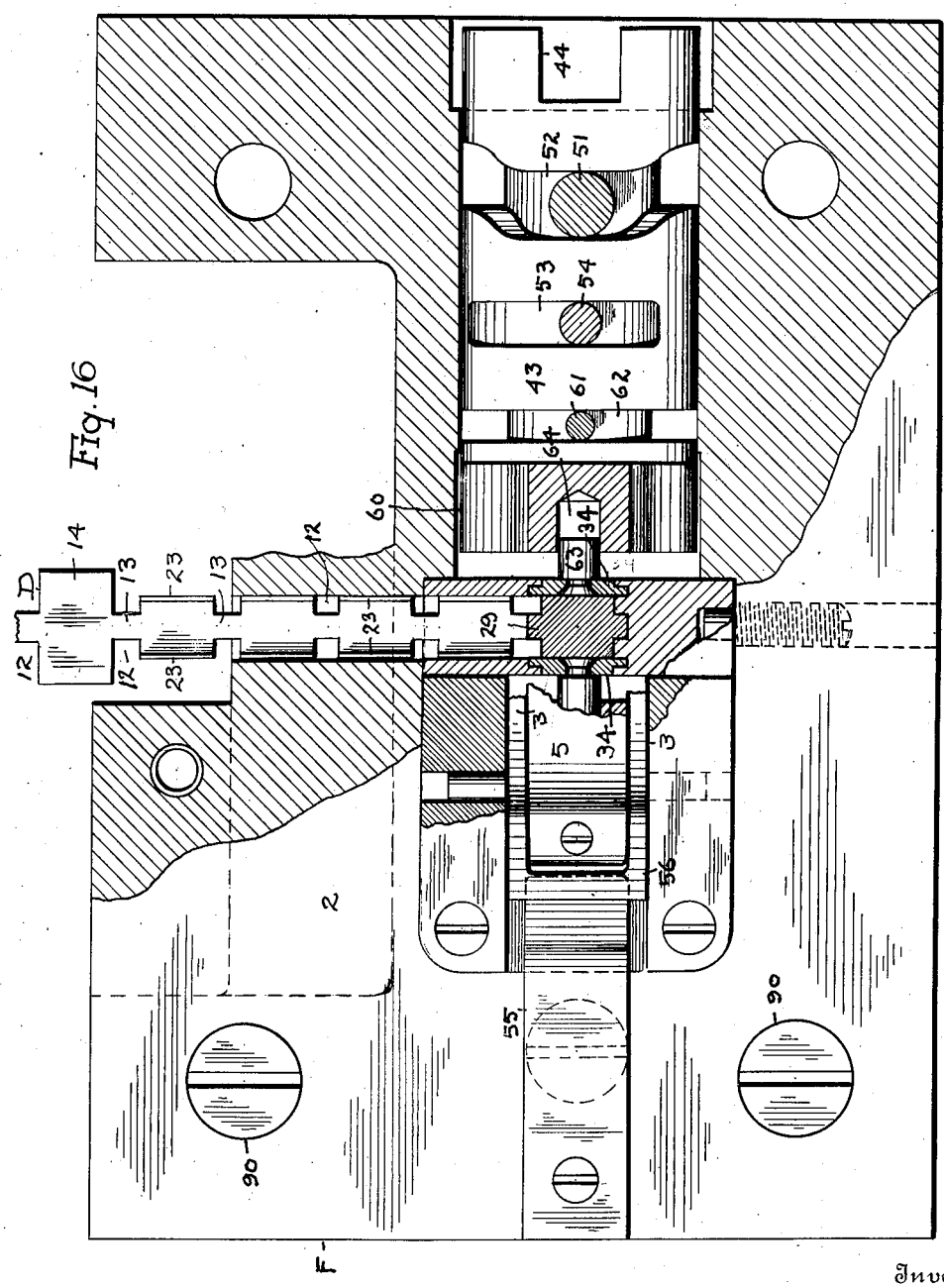

March 19, 1929.  W. G. LEHMANN ET AL  1,705,821
MACHINE FOR FABRICATING WIRE SPRING STRUCTURES
Filed Dec. 21, 1926  11 Sheets-Sheet 9
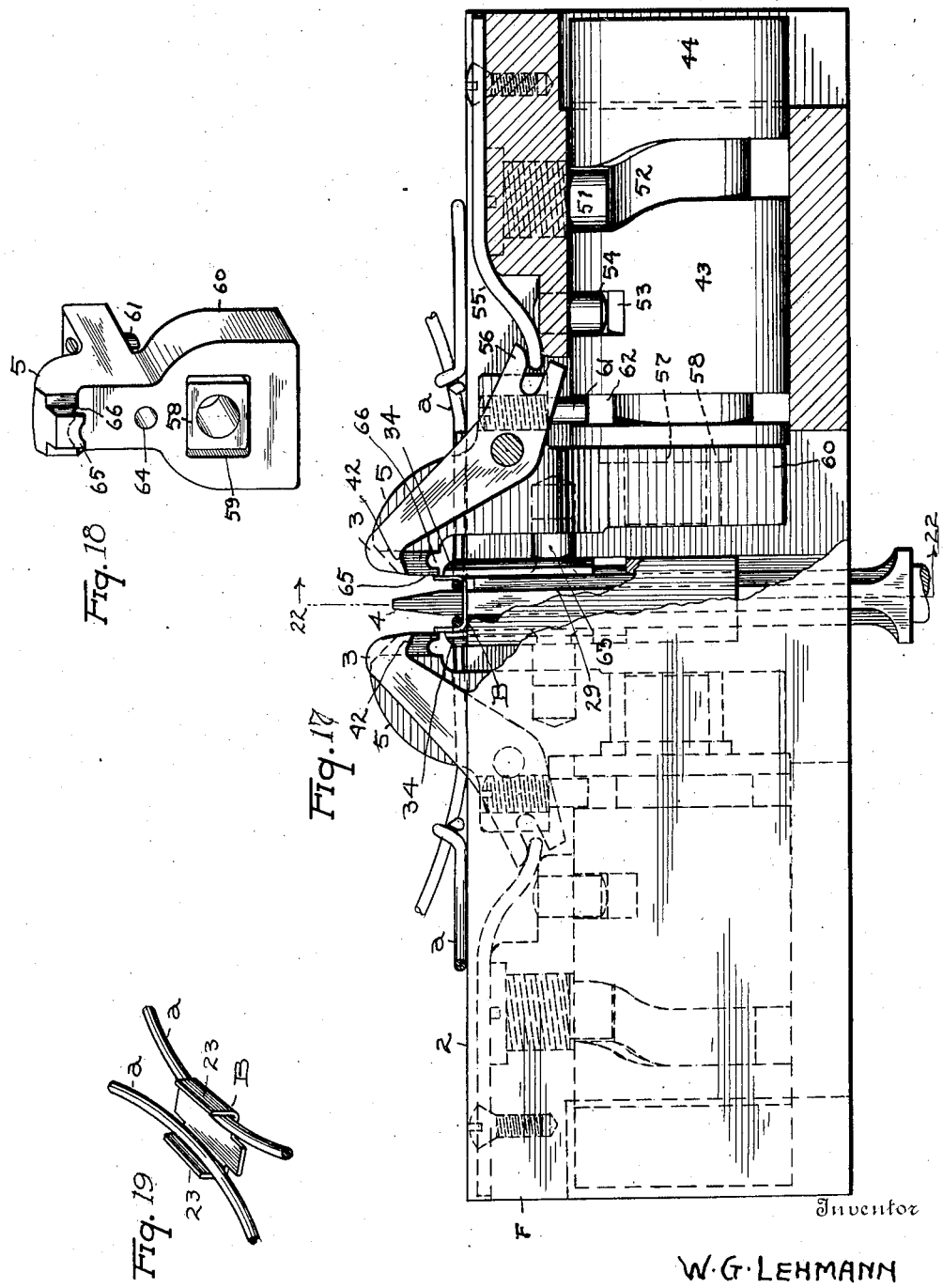
Inventor
W. G. LEHMANN
D. T. OWEN
Attorney

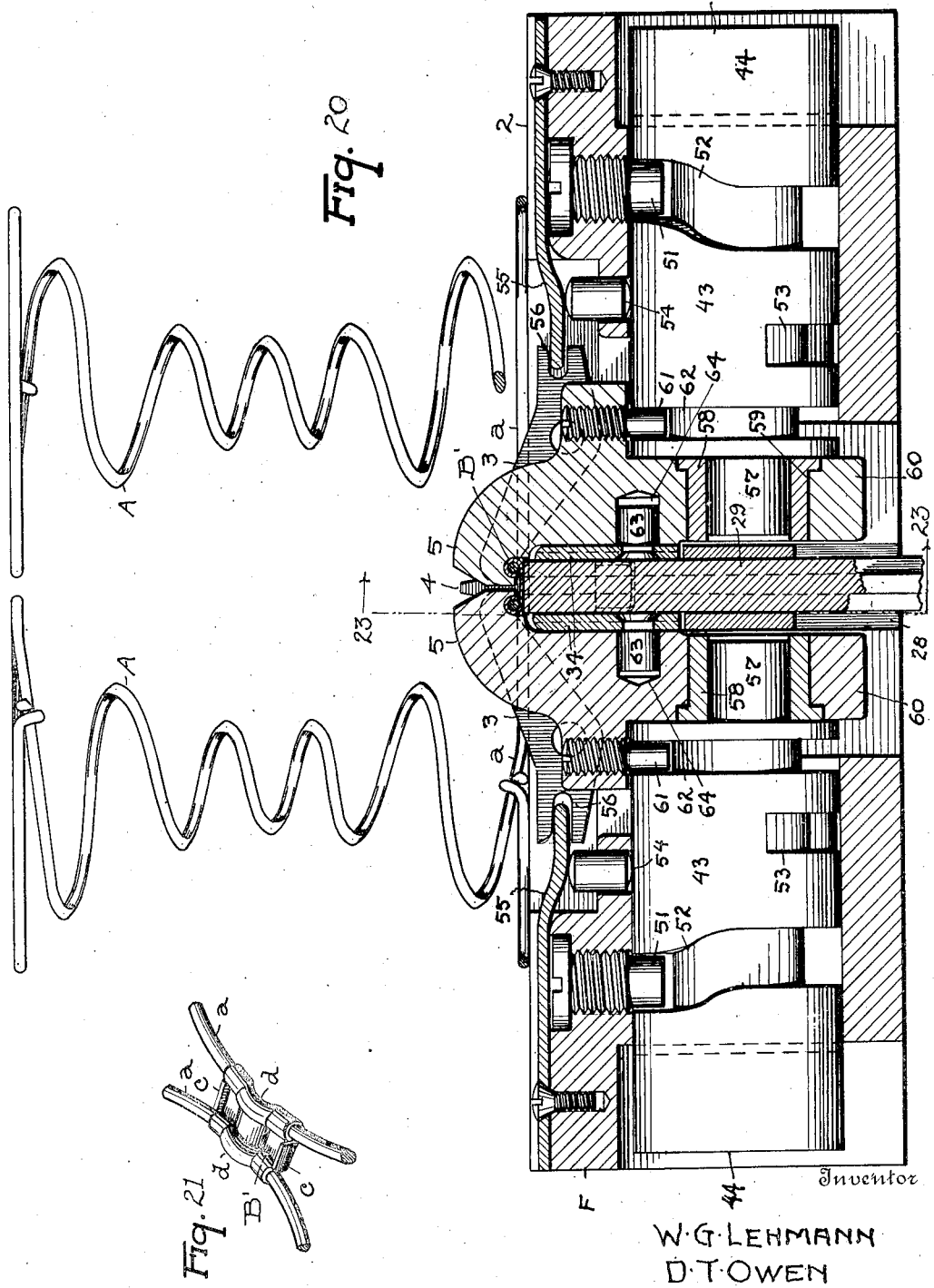

March 19, 1929. W. G. LEHMANN ET AL 1,705,821
MACHINE FOR FABRICATING WIRE SPRING STRUCTURES
Filed Dec. 21, 1926 11 Sheets-Sheet 11

Inventor
W. G. LEHMANN
D. T. OWEN
By Fisher, Moser & Cook
Attorney

Patented Mar. 19, 1929.

1,705,821

UNITED STATES PATENT OFFICE.

WESLEY G. LEHMANN AND DAVID T. OWEN, OF CLEVELAND, OHIO, ASSIGNORS, BY DIRECT AND MESNE ASSIGNMENTS, TO THE OWEN AUTOMATIC SPRING MACHINERY COMPANY, OF CLEVELAND, OHIO, A CORPORATION OF OHIO.

MACHINE FOR FABRICATING WIRE-SPRING STRUCTURES.

Application filed December 21, 1926. Serial No. 156,201.

Our invention relates to a machine for fabricating spring structures, especially bed spring bottoms, bed mattresses, spring cushions for upholstered furniture, automobile seats, and similar banks or groups of spiral wire springs, and the machine is particularly constructed to expedite and facilitate fabrication of such banks or groups of springs in an economical and efficient way. Thus, the machine comprising a flat top upon which any desired number of springs may be conveniently assembled and placed without interference with or by the operating mechanism. This mechanism feeds a strip of metal into the machine, produces flanged clips from this strip, raises each flanged clip to the flat top to permit the wires of two spiral springs to be seated therein, folds the flanges of the clip upon the wires, and upsets the folded clip and one or more of the wires. The mechanism is situated mainly beneath the flat top so that a single operator can handle the springs very freely and connect their corresponding ends together singly and successively in a row and also in parallel rows. The connected springs may also be inverted easily and shifted in any direction upon the table top to duplicate clipping operations at the opposite ends of the springs. Such in general are the objects embodied in the present machine, although other and more specific objects are embodied in the details of construction and aggroupment of parts as hereinafter more particularly described.

Figure 1:
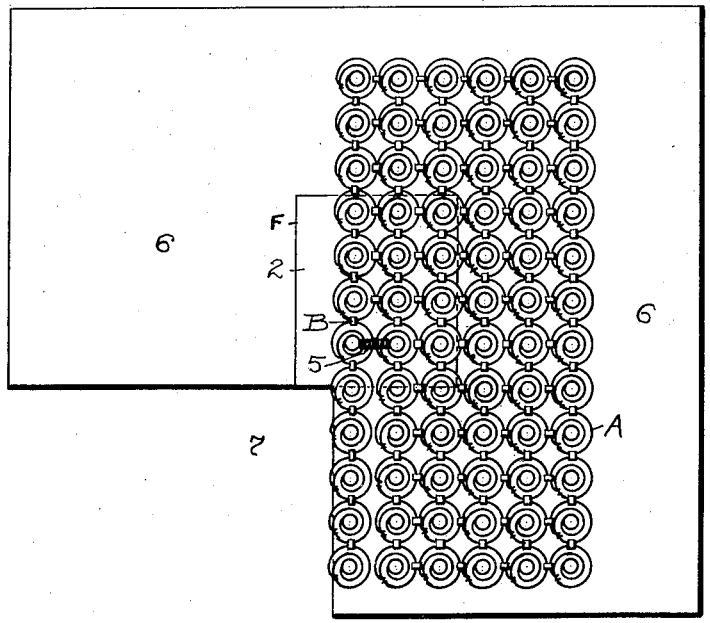
Figures 2, 3:
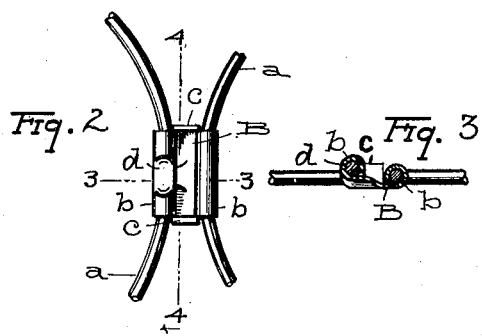
Figure 5:
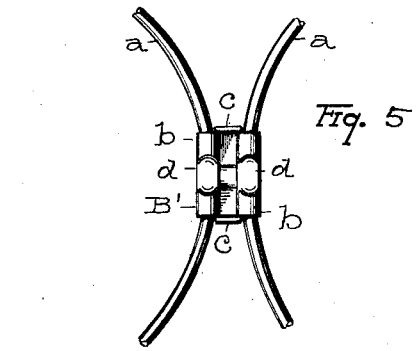
Figure 4:
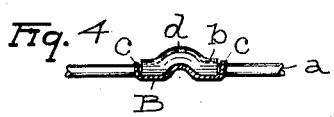

Thus, in the accompanying drawing, Fig. 1 is a plan view on a reduced scale of a bank or group of springs resting upon the top of the machine. Fig. 2 is a plan view of two segmental pieces of wire united together by a clip as effected in one by way of our machine. Fig. 3 is a transverse section of the same clip and wires on line 3—3 of Fig. 2, and Fig. 4 is also a sectional view of the same clip on line 4—4 of Fig. 2. Fig. 5 is a plan view of a clip crimped upon two wires as may also be effected by our machine. Fig. 6 is a top view of our machine, parts thereof being broken away, and the table portions which form lateral extensions of the top of the machine being omitted. Fig. 7 is a front elevation of the machine, a portion at the top being in section. Fig. 8 is a side elevation, parts of the machine being broken away to disclose the operating mechanism beyond. Fig. 9 is a sectional view and perspective of the notching dies.

Figure 22:
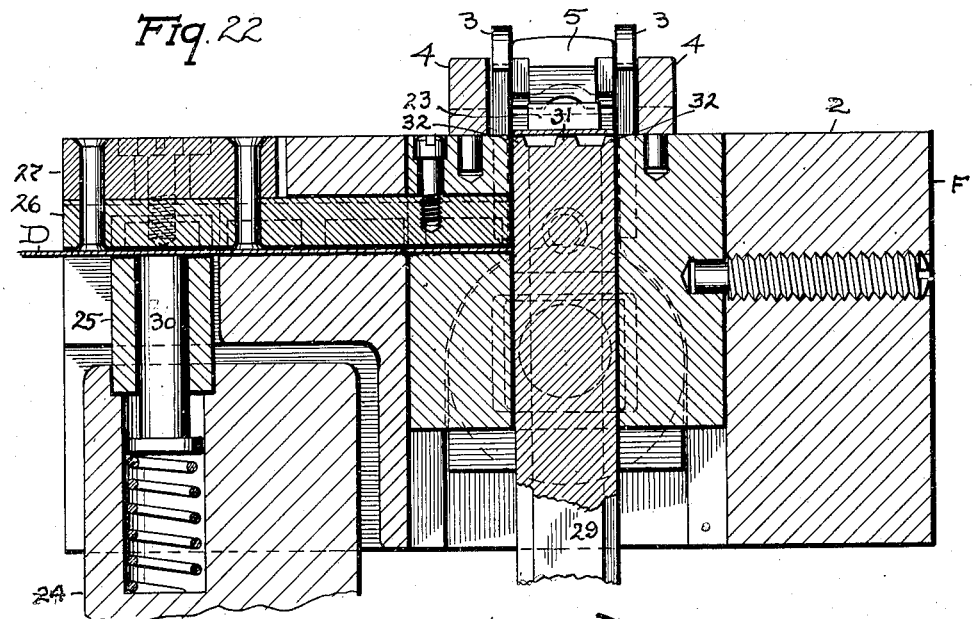
Figure 23:
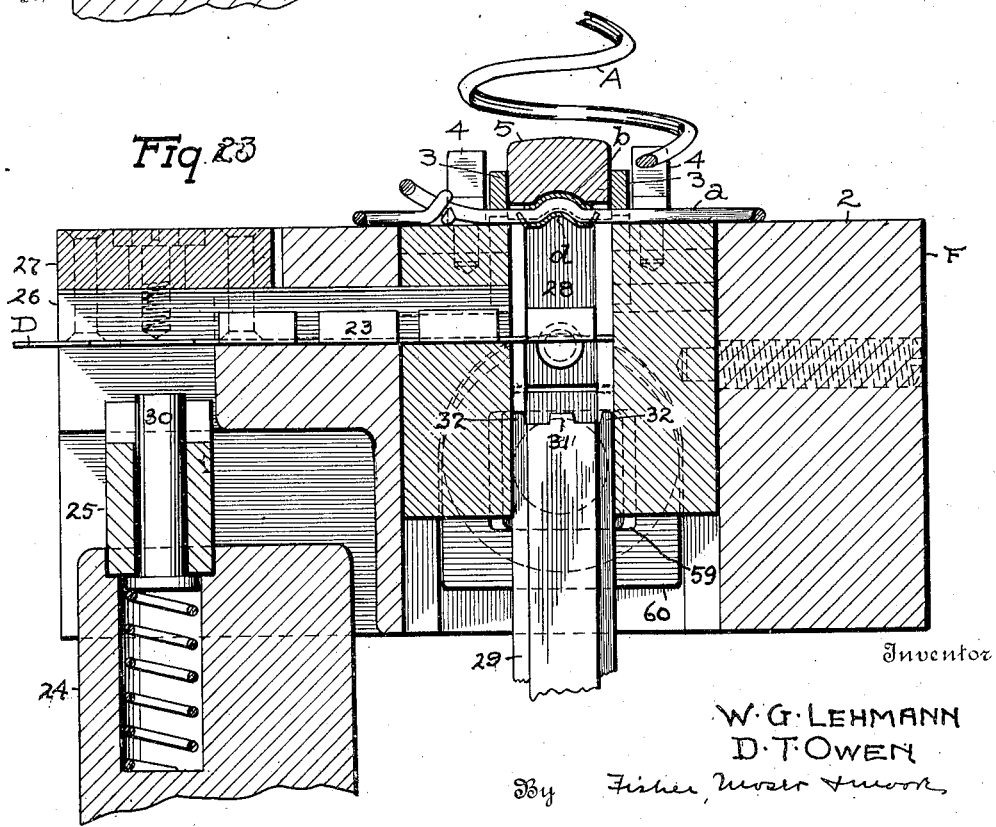

Fig. 10 is a rear elevation of the machine with the starting and stop clutch mechanism in section. Fig. 11 is a side elevation, showing the gearing at the left hand side of the machine and Fig. 12 is a view of two intermittent gears which are hidden in Fig. 11. Fig. 13 is a perspective view of the feeding device and the metal ribbon or strip from which the clips are formed. Fig. 14 is a sectional view and detail of the punch for folding the lateral wings of the notched ribbon or tape. Fig. 15 is a vertical section, centrally through the machine, on the line or path of the ribbon. Fig. 16 is an enlarged top view and horizontal section of the metal block, which is inset within the top of the machine and comprises the clip and spring uniting mechanism. Fig. 17 is a front elevation and part sectional view of the block and operating mechanism shown in Fig. 16. Fig. 18 is a reduced perspective view of one of the folding and crimping dies. Fig. 19 is a perspective view of a clip and the segmental portions of two wire springs seated in the same position therein as delineated in Fig. 17. Fig. 20 is a vertical section of the same block and mechanism shown in Fig. 17, but with the operating parts in a different working position, just completing the crimping of the clip to two wire springs. Fig. 21 is a perspective view of segmental portions of two wire springs connected together in the way delineated in Fig. 20. Fig. 22 is a vertical section on line 22—22 of Fig. 17 showing the working parts and a clip in the same operating position. Fig. 23 is a view very similar to Fig. 22, but showing the working parts in a different operating position and the section being through one of the crimping dies or jaws corresponding to line 23—23 of Fig. 20. However, in Fig. 20 the upsetting plunger for the clip is elevated to its limit, and in Fig. 23 it is retired or lowered.

In fabricating a spring cushion or spring bed bottom comprising coiled wire springs A, an exceedingly efficient and satisfactory spring structure may be obtained by connecting the corresponding end coils of the springs together by means of metal clips, providing the clips are firmly attached and no rattle, noise or loose play is permitted. Furthermore, it is very desirable to crimp the clips immovably upon at least one of the wires by indenting or crimping the wire and clip jointly where connected so that the clip will operate in effect as a rigid laterally-extending part of the wire thereby preventing excess play or movement of the connected springs relatively to each other under a load, in this way distributing the strains and the load over a larger area or greater number of springs.

The present machine is specially designed to produce the metal clips which are used to connect the springs together, and also to fold the clips around the wires and crimp both the wire and the clip in the same operation. Crimping may take place in either one or both of the wires to be connected, as illustrated in Figs. 2 and 4, respectively. Thus, in Fig. 2, we show two spring wire portions a—a connected together by a metal clip B which is formed from a flat strip or ribbon as will hereinafter appear. The sides of the clip are curled snugly around the two wires toward each other until the edges or extremities touch or are in substantially close contact with the main body of the clip, thus providing closed eyes or loops b—b for the wires, and the opposite ends of the clip are formed with short lips or flanges c—c which are folded at right angles to the flat body of the clip so as to extend between the two curved wires a—a. These lips or flanges space the wires apart and brace and support them against racking and twisting strains, thereby relieving the curled eyes or loops b—b of a large part of such strains. One curled side of the clip shown in Fig. 2 is deeply indented, preferably in the outer face of the clip at right angles to the axis of the wire within the curled portion of the clip, or in other words, transversely of the wire and the clip, and in making this indentation in the clip and its curled portion the wire itself is crimped in the same degree, thereby forming a crank-like portion in the wire and a corresponding offset —d— in the curled eye or loop b which absolutely prevents the wire from turning within the clip even under heavy stress. The other wire is snugly confined within the other curled portion of the clip and if not offset in the same way it may rotate or turn as in a hinge but without looseness or rattle because the curled portion completely envelopes the wire and the end bearing lips —c— for the wire prevents this wire from moving inwardly under a lateral pressure, and straining or opening the free end of the curled portion or eye b of the clip. The clip —B'— shown in Fig. 5 is made in the same way as clip B, except that both wires are rigidly fastened within the clip by indentations and offsets d—d, one in each curled portion or eye b—b in the clip. Either form of clip may be produced by our machine, using suitable crimping dies for that purpose, but the set of dies shown in the present machine are identical and designed to produce a double crimping of the wires and clip and an absolutely rigid tie or connection such as shown in Figs. 5 and 21.

In making such a tie or connection, or an equivalent or similar union of wire springs by means of a metal clip, due consideration must be given to the difficulties of handling and manipulating a bank or group of such springs as it grows or increases in size during the process of clipping the springs together, progressively in pairs, and row by row. To expedite and facilitate such proceedings our machine comprises a flat top 2 lying in a horizontal plane at a convenient working level above the floor where an operator may have a clear and unobstructed view. No obstructions surround the two springs which are being connected together, the only parts protruding above top 2 comprising two sets of gripping or holding fingers 3—3 for the end coils a—a of the wire springs, a pair of centering pins 4—4 and a pair of crimping dies 5—5, and these elements are closely grouped together so that they may project wholly within and between the two coiled springs which are being connected together. The top surface surrounding these parts is absolutely flat and unencumbered in every direction to permit either a small spring cushion or a full-sized bed bottom to be produced with perfect freedom thereon, see Fig. 1, wherein a wooden table 6 forms an extension of top 2 at the rear and each side of the machine and also partly in front at the right side of the machine, leaving an angular recess 7 in which the operator may stand in close working proximity to the dies where he may closely observe operations and conveniently handle and place the coiled springs upon a clip whenever one is produced and elevated to a receiving position between the dies.

The clips are produced from a narrow strip or ribbon D of metal which enters the rear of the machine and passes beneath a notching plate or die 8 carried by a vertically movable slide 9 confined in vertical guides 10, see Figs. 9 and 10. Plate 8 comprises two punching projections 11—11 adapted to make square notches 12—12 oppositely at close intervals in the longitudinal edges of strip D, thereby forming narrow connecting portion 13 centrally in the strip between successive wider portions 14, see Figs. 16 and 9. The male die or plate 8 co-acts with a female die or plate 15 secured in a stationary position upon a bridging or spanning part 16 of the main frame 17 of the machine, and the waste stock is discharged downwardly through a flaring opening 18. From this point the notched strip is drawn forwardly at intermittent intervals by a reciprocable feeding device E comprising a horizontal slide and spring-pressed pawl 19 which is adapted to engage the successive notched places in the strip, see Fig. 13. A pivoted detent 20 prevents the strip from moving backward during the idle movement of feeding device E, which is adapted to be operated by a connecting rod 21 and a crank or eccentric 22, or in any other suitable way.

The next step in the production of the clip consists in folding the wings or laterally extending parts of the wider portions 14 of the notched strip at right angles to the plane of the strip to provide parallel upright flanges 23 between the narrower connecting portions 13, or in other words, the strip is formed into a U-shape between the successive notches and narrow straight connecting portions 13, see Fig. 13. This operation is effected while the ribbon or strip is held stationary during the idle movement of the feeding device, and any suitable mechanism for accomplishing the desired purpose may be used. In the present machine, we show a vertically movable slide 24 carrying a channeled folding die 25 at its upper end adapted to engage the bottom side of the wing portions of the notched strip and constructed to bend or fold the wings upwardly around the sides of a horizontal forming bar 26 which extends lengthwise over the strip. Bar 26 is made of steel and suspended from a stationary cross piece 27 and extends forwardly for a substantial distance beyond folding die 25 to guide the notched and folded strip into a vertical passage 28 containing a reciprocable shearing and up-setting plunger or anvil 29. A spring-pressed member 30 in die 25 presses against strip D to permit withdrawal of die 25 without distorting the strip, and the front end of steel bar 26 co-acts with plunger 29 in shearing off all that part of the strip which is fed into passage 28, the feeding movement of the strip preceding the upward movement of plunger 29. Shearing occurs transversely at the middle of the narrow connecting portion 13, thereby providing the two short lips or flanges c—c which are later bent upwardly in completing the clip. However before such bending occurs, the lips or flanges c—c lie in the same flat plane as the main body of the U-shaped member when severed from the metal strip, so that when the shearing plunger 29 rises it will shove the severed U member upwardly in advance of the plunger until flush with the upper face of the metal block F within top 2 of the machine, substantially as shown in Fig. 22. The severed member now rests in a flat exposed position upon the upper end of plunger 29, which end is grooved or recessed transversely at each side of its center to provide a central indenting or crimping rib 31 and two end folding projections 32—32, see Fig. 22.

However, these projections and the rib do not fold and indent the clip member until the wire springs have been seated within the clip and other operations have occurred. Thus, when plunger 29 is raised nearly to its limit it stops and remains stationary as long as the operator of the machine may elect, and in fact the entire machine is at rest at this time because it is cut-off from all operating power altho under pedal and clutch control of the operator. This being the case the U-shaped clip member now rests in an exposed position upon plunger 29 and is held frictionally in that position by a pair of vertically slidable plates 34—34 which are confined within rabbeted channels in block 30 at opposite sides of passage 28 flush with the side faces of plunger 29, see Figs. 16 and 17. The backing plates 34 project to a higher level than the top of plunger 29 when the parts are stationary as shown in Fig. 7, thus permitting the U-shaped clip member to be gripped firmly between them, and the folded side flanges of the clip member extend upwardly a still greater distance to permit their free ends to be engaged and folded inwardly by the overhanging jaws of the crimping dies 5—5 which are normally held apart from or retired in respect to plunger 29 and the clip engaging plates 34—34, as illustrated in Fig. 17. The double set of pivoted fingers 3—3 for holding the wire springs are arranged on opposite sides of plunger 29 and the clip thereon, and the pair of beveled upright pins 4—4 for guiding and centering the two wire springs are located medially between the two jaws and the two sets of holding fingers. The folding jaws are retired and the pivoted holding fingers are raised when the machine is at rest with the U-shaped clip seated in an exposed position upon the plunger; consequently a pair of circular wire springs may be placed flat and in closely spaced relation upon top 2 with their respective loops surrounding corresponding operating parts and with segmental portions of the wire loops nested very closely together within the clip, the wires being held apart by the upright pins 4—4 and also pressed against the upright flanges of the clip, see Figs. 17 and 19.

The clip may now be curled around the wires by starting the machine, which is effected by operating foot treadle 39 and therethrough an automatic clutch C which controls the application of power from a constantly running electric motor 40 mounted upon base 41 of the machine. The first noticeable result at the jaws is a downward movement of the wire-gripping fingers 3—3, which hook over and draw the wires away from each other toward the flanges of the clip by means of their inclined or beveled engaging portions 42, see Fig. 17, thereby locking the wires within the open clip. Then the two hook-shaped jaws or dies 5—5 move toward each other on a straight horizontal line until they abut; thereby folding the flanges over the wires. Then these jaws move downwardly on a straight vertical line in unison with fingers 3 while plunger 29 completes its upward stroke, thereby upsetting and crimping the clip and one or both wires. Finally the jaws and fingers open up, and the plunger is reciprocated to shear off and raise another clip to an exposed receiving position, the machine stopping automatically when the said cycle of movements is completed.

The closing of fingers 3—3 upon the wires and the horizontal and downward shift of the jaws 5—5 to curl the flanges of the clip around the wires is effected by revolving a pair of cam shafts 43—43 and at the same time moving said shafts longitudinally within their bearing in block F. The operating parts being in duplicate on opposite sides of the plunger the same reference characters may represent like parts, it being understood that the jaws and shafts move toward each other. Thus, each shaft has a slotted outer extremity 44 slidably and detachably engaged with a lateral driving projection 45 upon the side face of a pinion gear 46 journaled within the side of main frame 17, see Fig. 7, and which pinion gear is rotated at intermittent intervals by a larger spur gear 47, an intermittent gear 48, and a mutilated gear 49 mounted upon the main drive shaft 50 which is in clutch and gear connection with the motor. Referring to Fig. 17, with the understanding that cam shaft 43 is thus rotated at intervals, it will be noted that a fixed pin 51 extends into an annular cam groove 52 in the shaft, whereby the shaft will be reciprocated during its rotation and in so doing move the jaw or die 5 first toward and then away from plunger 29. Cam shaft 43 is also slotted and flattened at 53 to receive and engage a short bolt 54 which is adapted to raise the bent end of a flat spring 55 which extends into the forked end 56 of the pivoted wire-gripping finger 3 so that when the cam shaft is rotated it will tilt the finger into gripping engagement with the wire portion —a— of the coiled wire spring A. The inner end of the cam shaft is provided with an eccentric or crank pin 57 operating in a square block 58 which is free to slide in a straight slot 59 within the depending part 60 of the jaw or die 5, see Fig. 18, and the cam shaft has thrust engagement with the depending part 60. A short pin 61 carried by a lateral extension on die member 3 extends into an annular groove 62 in the cam shaft to force the die member to move back and forth with the cam shaft but without preventing the die member from being moved vertically by the eccentric pin 57. In moving vertically the die member imparts a corresponding movement to the sliding plate 34 which engages the clip frictionally during an interval of operations, the said plate 34 having a round projection 63 extending therefrom into a round socket 64 in the face of the die member, see Fig. 20. Plate 34 is free to move vertically but not laterally; therefore, when die member 5 is retired and moves away from the plate as seen in Fig. 17, the round projection 63 slides within its socket but the movement is limited and the parts are not disconnected. At the beginning of rotation of cam shaft 43 bolt 54 is raised and the gripping finger 3 is tilted, which movement is closely followed by a longitudinal movement of the cam shaft as the bolt 54 leaves its slot 53. Die member 3 is thus forced toward plunger 29 and its overhanging jaw folds the upstanding flange of the clip around the wire. The downward movement of die member 3 is practically negligible at the beginning of the rotary movement of cam shaft 43 but as soon as the opposed jaws of the two die members 3 are brought together the downward movement thereof is accelerated as the eccentric or crank pin 57 describes its arc movement, and the clip holding plates 34 move down at the same time to permit the dies to operate. Plunger 29 is stationary at this time and the folded wings or flanges of the clip are now curled completely around the round wire by the depending lip 65 on the overhanging jaw, a round groove 66 in the bottom of the overhanging jaw also aiding to wrap the clip around the wire. When the eccentric or crank pin 57 has carried the die to the limit of its downward movement the crank pin is practically on a vertical dead center, and plunger 29 is then forced upward suddenly, although only a short distance, while the jaws are still closed. As a result the curled portion around the wire and the wire itself is indented or offset from the bottom upwardly by the indenting or crimping rib 31 at the center of the plunger, see Fig. 23. In this view the tie is completed and released from die 5, and as shown, wire —a— and the curled portion —b— of the clip are jointly indented or crimped. The working relation of the parts in producing the crimp is illustrated in Fig. 20, the section line through the plunger being taken centrally through the crimping rib 31 at the top of the plunger and the indentation produced in the clip extends clear across the clip as seen in Fig. 21. The die formation for crimping the clip and wire is further shown in Fig. 18.

As soon as the tie is completed the upsetting plunger descends and a new blank is fed into the plunger passage. During this interval cam shaft 43 will raise and retire the crimping dies 5—5 and release the wires from the gripping fingers which are thrown open by the flat springs 55 as soon as the cam shaft moves longitudinally outward to place slot 53 in line with bolt 54. When the cam shaft and its associated parts are at the place of beginning, the machine stops with the dies open as seen in Fig. 17.

A timed movement of the various operating instrumentalities herein described is effected by suitable gearing and shafts through which the power from motor 40 is transmitted. Thus a mutilated gear 66 affixed to the clutch-operated shaft 50 engages in a locking and driving manner an intermittent gear 67 on a crank shaft 68 journaled in the main frame at the front of the machine. A rocking beam 69 is connected at one end to the crank portion of shaft 68 and at its opposite end to a rock arm 70. An adjustable connecting rod 71 connects the rock arm end of beam 68 with slide 9 carrying notching die 8, and a second adjustable connecting rod 72 is pivotally connected with the beam near its crank end to operate slide 24 which carries die 25 used in folding the strip into U-shape. A third adjustable connecting rod 73 attached to beam 69 at its crank end operates a slide 74 which carries the shearing and upsetting plunger 29, see Fig. 15. The feeding device E is actuated when the intermittent gear 48 and spur gear 47 are under rotation, an intermediate gear 75 transmitting the movement from gear 47 to a smaller gear 76 on a shaft 77 carrying the eccentric or crank 22 to which the connecting rod 21 of the feeding device is attached, see Figs. 8, 11 and 15.

Any suitable clutch may be used to control the starting and stopping of the machine, but as shown herein foot pedal 39 is connected to a pivoted latch 77' which engages a spring-pressed bolt 78, see Fig. 10, in a fixed collar 79 on shaft 50. Depression of the pedal releases the bolt, which bolt will then enter one of the radial slots 80 in the hub 81 of the revolving worm gear 82 driven by motor 40. Rotation of shaft 50 drives the other gearing and produces the cycle of movements described, and then bolt 78 is withdrawn by latch 77' when the notched part of the bolt strikes the beveled end 83 of the latch shown in Fig. 6. However, a cam 84 on crank shaft 68 holds latch 77' out of the path of rotation of the bolt until a desired number of revolutions of shaft 50 takes place. The machine then stops with a new clip in place beneath the completed tie which may now be removed from the open dies.

To facilitate the substitution of different dies and their immediate operating parts en bloc, we mount the gripping fingers 3—3, crimping dies 5—5, and cam shafts 43—43, together with other parts, within a separate rectangular block F which is adapted to be inset within the flat top 2 of the machine and removably held therein by screws 90.

What we claim is:

1. A machine for fabricating spring structures, comprising a table adapted to support a plural number of spiral springs shiftably thereon, and means projecting upwardly through said table at closely spaced places adapted to enter each of the bottom loops of two juxtaposed springs and to connect the opposing circumferential portions of said loops directly together.

2. A machine for fabricating spring structures, comprising a table adapted to seat a plurality of coiled springs in grouped formation, shiftable clamping means projecting through said table adapted to separately grip a pair of springs seated upon the table, and means adapted to connect the gripped portions of said pair of springs directly together.

3. A machine for fabricating spring structures, comprising a table adapted to support spiral wire springs in juxtaposition, means adapted to feed a flanged clip upwardly through said table to permit two wire springs to be seated within said clip, a set of wire gripping fingers adapted to spread the seated wire portions apart within the clip, and means adapted to fold the flanges of the clip around said wire portions.

4. A machine for fabricating wire spring structures, comprising a table top adapted to support a pair of springs in juxtaposition, vertical dies projecting upwardly through said table into the lower end of both springs, and a vertical plunger adapted to elevate a metal clip into said dies and to indent the clip in the same operation.

5. A machine for fabricating wire spring structures, comprising means adapted to form a clip having side and end flanges, and co-acting dies adapted to curl the side flanges of the clip around separate wires and to fold the end flanges between said wires.

6. A machine for fabricating wire spring structures, comprising means for feeding a metal strip, means for notching said strip and forming a U-shaped clip between the notches therein, and co-acting dies adapted to affix each clip rigidly to one wire and pivotally to a second wire.

7. A machine for fabricating wire spring structures, comprising a table, a clip forming device beneath the top of said table, means adapted to raise each clip to an exposed position at the top of said table, and means adapted to fold each clip when elevated.

8. A machine for fabricating wire spring structures, comprising means for feeding a metal strip, means for forming clips successively from said strip, and means for attaching a formed clip to a pair of wire springs simultaneously with the formation of another clip by said forming means.

9. A machine for fabricating wire spring structures, comprising mechanism for making clips, pivoted clamping devices adapted to contemporaneously clamp two wire springs rigidly in juxtaposed position, means adapted to convey a completed clip to said wire clamping device, and means adapted to affix said clip to said wires.

10. A machine for fabricating spring structures, comprising means for producing a U-shaped clip, means adapted to elevate said clip to the top of said machine, means adapted to clamp separate wire springs within the elevated clip, dies adapted to fold said clip upon the wires, and a plunger adapted to indent said clip and at least one of said wires.

11. A machine for fabricating spring structures, comprising means adapted to form clip blanks in a metal strip, and means adapted to shear said clip blanks from said strip and to elevate each blank when sheared to an exposed position at the top of said machine.

12. A machine for fabricating wire structures, comprising a pair of horizontally movable dies, wire gripping devices at each side of said dies, and automatic means co-operating with said dies adapted to curl separate portions of a metal clip around separate wires concurrently.

13. A machine for fabricating wire structures, comprising a stationary table, a pair of opposed dies projecting upwardly through said table, means adapted to force said dies together and downwardly in respect to the top of said table, means adapted to support an open metal clip between said dies in the plane of the top of said table, means adapted to clamp the bottom loops of a pair of wire springs upon said table and in spaced relation within said clip, and the said means for actuating the pair of said dies being arranged to curl separate portions of said clip independently around said wires co-incidently.

14. A machine for fabricating wire structures, comprising a stationary supporting surface for a pair of coiled wire springs, a pair of opposed dies, means adapted to support separate wire portions of said springs and an open clip in a stationary position between said dies, and automatic means adapted to move said dies toward each co-incidently and thence together downwardly co-incidently to curl separate portions of said clip around said wires.

15. A machine for fabricating wire structures, comprising a stationary support for a pair of wires, a pair of hook-shaped dies projecting upwardly through said support, means adapted to support a metal clip having parallel vertical flanges between said dies with the wires seated between said flanges, and means adapted to move said dies together and fold said flanges simultaneously around separate wires seated within the clip.

16. A machine for fabricating wire structures, comprising a flat table having a vertical passage therein, a pair of clenching dies protruding upwardly from said top upon opposite sides of said passage, and means adapted to elevate a flanged clip to a stationary position level with the flat surface of said top to permit separate wires to be seated within the clip between said clenching dies.

17. A machine for fabricating wire structures, comprising a seating surface for a plurality of wires, a pair of dies projecting vertically above said surface, and a vertically-movable plunger adapted to raise a flanged clip to the same horizontal plane as said seating surface.

18. A machine for fabricating wire structures, comprising a work supporting top and a pair of dies projecting above said top adapted to be moved into abutting relation to provide an inverted anvil, and a reciprocatory plunger adapted to raise a flanged clip into clenching position against said abutting dies.

19. A machine for fabricating wire structures, comprising a top adapted to support separate wires in the same horizontal plane, a pair of dies spaced apart to receive the wires and adapted to move toward each other into abutting relation, a plunger adapted to raise a flanged clip between the spaced dies, and means adapted to space the wires apart between the flanges of the raised clips to permit each wire to be clenched separately by the clip.

20. A machine for fabricating wire structures, comprising a vertically movable plunger adapted to support a flanged clip, a pair of clenching dies adapted to fold the flanges of said clip around a pair of wires seated within the clip, and means adapted to force said wires apart when seated within the clip between said clenching dies.

21. A machine for fabricating wire structures, comprising a horizontal table, wire gripping fingers and centering pins and crimping dies grouped together within the top of said table, said top having a flat unobstructed surface adjacent said grouped parts to permit a bank or group of springs to be seated and shifted freely thereon, and means beneath said table adapted to feed metal clips into said crimping dies.

22. A machine for fabricating wire structures, comprising an L-shaped table adapted to seat spiral springs in shiftable position thereon, and clipping mechanism for said springs extending upwardly through said table in the angular corner between the oppositely extending arms of said table.

23. A machine for fabricating wire structures, comprising means adapted to feed a metal strip, means for notching said strip at intervals, means for folding the sides of said strip intermediate the notches at right angles to the plane surface of said strip, and means for severing the strip in the area adjacent the notches therein.

24. A machine for fabricating wire structures, comprising means for feeding a metal strip having alternate wide and narrow portions, means for folding the wide portions of the strip at right angles to the plane surface of the strip, and means for severing the strip centrally in its narrow portions to produce clip blanks having both side and end flanges.

25. A machine for fabricating wire structures, comprising means for feeding a metal strip having alternate notched and widened portions, means for folding the wide portions of said strip at right angles to the plane of said strip, a set of crimping dies, and means for shearing the strip where notched and simultaneously elevating the sheared portion into a set of crimping dies.

26. A machine for fabricating wire structures, comprising a set of crimping dies, means adapted to feed a metal clip between said dies, said clip and dies being adapted to receive wires, means adapted to force said dies toward each other co-incidently to partly fold the clip around the wires, and means adapted to lower said dies in unison to crimp the folds of said clip separately around the wires.

27. A machine for fabricating wire structures, comprising a set of hook-shaped die member, means adapted to shift said members toward each other and thence at right angles, and means co-acting with said die members adapted to fold a flanged clip around a plurality of wires inserted between the clip and said die members.

28. A machine for fabricating wire structures, comprising die members adapted to fold a flanged clip around a plurality of wires, a plunger adapted to convey a flanged clip to said die members, and means connected with said die members adapted to frictionally hold each flanged clip in transit to said die members.

29. A machine for fabricating wire structures, comprising movable die members, a plunger adapted to convey flanged clips to said die members, and slidable elements connected with said die members adapted to hold said clips frictionally in a central position between said die members.

30. A machine for fabricating wire structures, comprising shiftable die members, a reciprocable plunger adapted to convey flanged clips to said members, gripping means for the clips slidably connected to said plunger, and means adapted to shift said die members and gripping means vertically in respect to said plunger.

31. A machine for fabricating wire structures, comprising a set of die members, rotatable means adapted to raise and lower said die members, cams adapted to shift said die members laterally in respect to each other, and a reciprocable plunger adapted to convey a flanged clip centrally between said die members.

32. A machine for fabricating wire structures, comprising a set of clip folding dies, rotatable crank shafts adapted to raise and lower said dies, and means adapted to reciprocate said shafts longitudinally to shift said dies laterally.

33. A machine for fabricating wire structures, comprising a set of clip folding dies, crank shafts adapted to raise and lower said dies, and cams adapted to reciprocate said shafts and dies.

34. A machine for fabricating wire structures, comprising a set of clip folding dies, a clip conveying plunger between said dies, clip gripping plates slidably connected to said plunger and to said dies, means adapted to impart a common lift and lowering movement to said dies and plates, and means adapted to shift said dies toward each other and said plates.

35. A machine for fabricating wire structures, comprising a set of clip-folding die members, a set of wire-gripping devices mounted at opposite sides of said die members, means adapted to support a flanged clip between said members and devices, means adapted to shift said members in respect to said clip, and means adapted to motivate said wire-gripping devices preliminary to shifting said die members.

36. A machine for fabricating wire structures, comprising a set of reciprocable die members, a set of oscillatory wire gripping members, means adapted to convey a flanged clip to said die members, means adapted to reciprocate said die members in both horizontal and vertical planes, and means adapted to oscillate said wire-gripping members at the beginning and end of the reciprocable movements of the die members.

37. A machine for fabricating wire structures, comprising a set of reciprocable members having overhanging die portions, means adapted to reciprocate said members to bring said die portions together, means adapted to lower said members conjointly, wire-gripping fingers pivotally mounted at opposite sides of said die portions, means adapted to tilt said fingers on their pivots, and a reciprocable plunger adapted to convey a clip to said die portions, said plunger having a co-acting die portion adapted to indent said clip.

38. A machine for fabricating wire structures, comprising a flat table having a block removably mounted within its top, and wire connecting mechanism mounted within said block and bodily removable therewith from said table.

39. A machine for fabricating wire structures, comprising a table having an inset block containing movable dies adapted to fold a clip upon wires seated upon said block, and means beneath said table adapted to operate said dies, said block and dies being a removable part of said table and freely disengageable from said operating means.

40. A machine for fabricating wire structures, comprising a table having a removable block therein, and a set of clip crimping dies, wire-gripping members, and operating means for said dies and members, mounted within said block and removable therewith from the table.

In testimony whereof we affix our signatures.

WESLEY G. LEHMANN.
DAVID T. OWEN.